May 6, 1930.  M. W. BANTON  1,757,286
RABBLE FOR MANNHEIM FURNACES
Filed Oct. 25, 1927
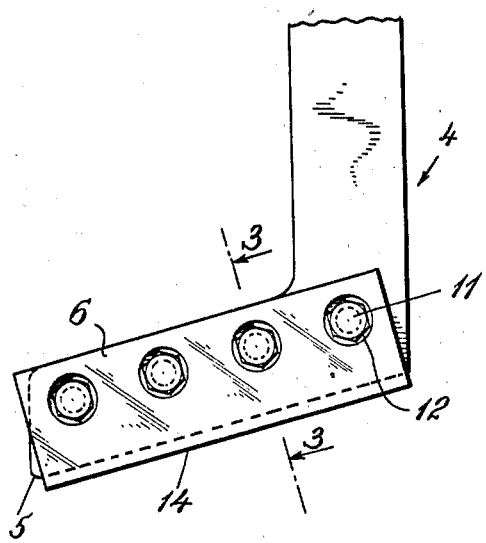
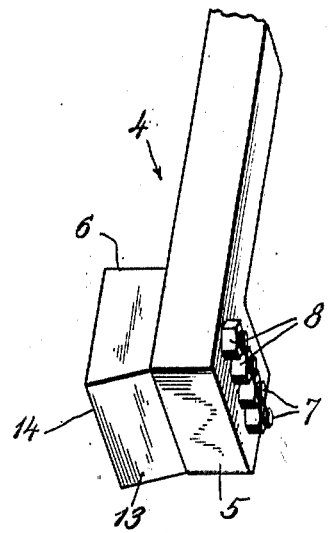
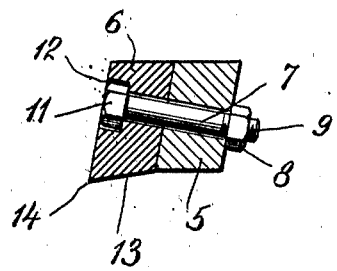
INVENTOR
Madison W. Banton
BY
Forbes Silsby
ATTORNEY Patented May 6, 1930

1,757,286

UNITED STATES PATENT OFFICE

MADISON W. BANTON, OF CHICAGO, ILLINOIS, ASSIGNOR TO GENERAL CHEMICAL COMPANY, OF NEW YORK, N. Y., A CORPORATION OF NEW YORK

RABBLE FOR MANNHEIM FURNACES

Application filed October 25, 1927. Serial No. 228,560.

My invention relates to mechanical rabbles, and more particularly to rabbles that are subjected to erosive and corrosive action.

In the well known Mannheim furnaces in which muriatic acid and salt cake are manufactured under the influence of heat from salt and nitre cake, which contains sulphuric acid, mechanical rabbles are provided to agitate the mass of reaction materials and to propel the salt cake formed to a discharge outlet. Constructions of such a type are disclosed for example, in the U. S. Patents to Hasenbach 726,911 and Fowler 1,184,339.

The salt cake resulting from the reaction in the muffle is gradually displaced outwardly towards a discharge outlet at the periphery. This displacement of the dried and drying salt cake is accomplished by means of a plurality of rows of downwardly extending rabbles of cast or wrought iron, mounted on horizontal rabble arms which rotate about the center of the pan. The rabbles are so mounted that the front of the operating part or tooth of each rabble faces slightly outwardly from the path of rotation to direct the salt cake lying in its path into the path of the next outer rabble. By this arrangement the material is gradually displaced outwardly by successive rabbles and is finally delivered to the discharge outlet.

The iron rabbles in these furnaces are destroyed very rapidly, and their replacement involves appreciable difficulty. To replace the destroyed rabbles the operation of the furnace must be suspended, the muffle cooled down, and the salt cake therein scraped out. This procedure usually requires several days for its completion, and the delays occasioned thereby are of such frequent occurrence as to cause a material retardation of production.

I have investigated this rabble destruction with the object of providing a rabble structure which will effectively withstand the strongly destructive action to which it is subjected in furnaces manufacturing muriatic acid and salt cake, whereby replacement delays will be reduced to a minimum with a consequent increase in the efficiency of production. As a result of my investigations I have found that the entire rabble structure does not deteriorate uniformly, but that the destructive effects are progressively concentrated mainly at those faces of the rabbles which contact with the salt cake during the movement of the rabbles. As the hot salt cake advances towards the periphery of the heated pan, gradually drying out and hardening, it becomes increasingly resistant to displacement; and it is to the erosive effect of this resistance to the action of the rabbles that the rapid destruction thereof seems in great measure ascribable. The corrosive nature of the materials involved in the reaction also appears to add greatly to the destruction, and the same is true of the heat in the muffle.

The foregoing considerations have led me to experiment with various materials to determine whether, by using a selected substance as a facing for the rabbles, and properly located thereon, it might not be possible to considerably prolong the life of the ordinary iron rabble.

I have experimented in this relation with various materials and constructions, and combinations of the same, and I have found that if a protective facing block of the material commonly referred to as carborundum is provided on the surface of each iron rabble in the region of the same most affected by the action in the furnace, that a surprising prolongation of the life of the ordinary rabble is thereby attained. The erosion factor, apparently the main contributor to the destructive action, appears to be very substantially counteracted by such an arrangement, the element of corrosion seems to be reduced to such an extent as to be almost negligible, and a pronounced enhancement of the mechanical strength of the rabble results.

A preferred embodiment of my invention is described in the following specification, taken in conjunction with the accompanying drawings in which Figure 1 is a front elevation of a rabble embodying my invention, Figure 2 is a side view of the same in perspective, Figure 3 is a sectional side elevation taken along the line 3—3, Figure 1.

Referring to the drawings, reference numeral 4 designates a cast or wrought iron rabble of any approved construction, which rabble is to be secured to and depend from one of the rotating, horizontal rabble arms of a Mannheim furnace, such for example as shown in U. S. Patents 726,911 and 1,184,339 hereinbefore referred to. The lower end of the usual rabble 4 terminates in a tooth 5 which may be of any desired construction, which tooth, when the rabble is mounted on the rabble arm, normally extends into the layer of salt cake in the pan of the muffle for displacing the salt cake toward the outlet.

A protective facing block 6 of a material of the nature of carborundum is provided upon the face of the tooth 5 which will be in front of the same as regards the path of travel of the rabble through the salt cake mass. This facing block is detachably attached to the tooth by means of headed bolts 7 or the like which extend through the facing block and tooth and are detachably retained by nuts 8 on their threaded ends 9. The head 11 of each bolt is countersunk in a recess 12 in the front of the facing block in order to protect the bolt and to avoid the accumulation of salt cake which might occur if the bolts projected beyond the face of the block.

As will be noted from an inspection of Figure 3 the bottom 13 of the block 6 extends downwardly and outwardly from the tooth 5, and terminates in the forward scraping edge 14. The substantially unbroken sloping surface presented by this bottom 13 of the block will tend to prevent the formation of a hard mass of salt cake between the bottom of the rabble and the pan of the muffle.

The facing block 6 is constructed of the material known as carborundum, an electric furnace product constituted mainly of silicon carbide. I have found this material to be peculiarly and distinctively well suited to withstand all phases of the attack to which it is subjected in muriatic acid and salt cake production. It not only offers considerable resistance to the pronounced erosive action of the solid reaction materials, but also is substantially uncorroded by the chemically active materials in the strongly heated furnace.

If a material is used for the rabble which is non-erodible but which is at all vulnerable as regards corrosion by the reaction materials involved muriatic acid and salt cake production, the advantage of using a non-erodible material would be nullified. The products of corrosion which might be depended upon to form a protective coating upon the surface of the rabble, and thus retard further corrosion, are, in themselves, erodible products and therefore would be continually removed by the erosion, thus exposing a fresh surface for further corrosion. By the use of the non-erodible and non-corrodible carborundum facing of my invention, however, applied in the region of the rabble which is subjected to erosive action, there will be no removal of the corrosion-retarding coating which is formed on the rabble through the physical or chemical medium of the reaction materials. Both the erosion and corrosion factors are substantially provided for thereby, and the destruction of the rabbles which has heretofore been so marked in salt cake furnaces is diminished to a surprisingly great extent.

The use of rabbles constructed in accordance with my invention in muriatic acid and salt cake furnaces results in a very appreciable prolongation of the rabble life therein, decreases proportionately the objectionable replacement delays which at present lower the efficiency of production, and permits the manufacture of salt cake substantially uncontaminated by the undesirable products of rabble destruction.

I claim as my invention:

1. In a furnace for manufacturing muriatic acid and salt cake, a rabble for agitating the reaction materials, said rabble having a protective facing of carborundum over the region of the rabble which makes contact with said reaction materials.

2. In a furnace for manufacturing muriatic acid and salt cake, a rabble for agitating the reaction materials which comprises, a rabble tooth, and a protective facing of carborundum attached to said tooth on the front face thereof.

3. In a furnace for manufacturing muriatic acid and salt cake, a rabble for agitating the reaction materials which comprises, a rabble tooth, and a protective facing block of carborundum detachably attached to said tooth and extending over the front face thereof to cover said face substantially entirely, said facing block having a scraping edge extending below said rabble tooth.

In testimony whereof I affix my signature.

MADISON W. BANTON.